United States Patent
Jamal-Syed et al.

(10) Patent No.: US 9,380,621 B2
(45) Date of Patent: Jun. 28, 2016

(54) PAIRING A MOBILE TERMINAL WITH A WIRELESS DEVICE

(75) Inventors: Shaheer Jamal-Syed, Tyresö (SE); Daniel Vahlne, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 13/505,793

(22) PCT Filed: Apr. 12, 2012

(86) PCT No.: PCT/SE2012/050393
§ 371 (c)(1),
(2), (4) Date: Oct. 29, 2014

(87) PCT Pub. No.: WO2013/154476
PCT Pub. Date: Oct. 17, 2013

(65) Prior Publication Data
US 2015/0133051 A1    May 14, 2015

(51) Int. Cl.
| H04W 64/00 | (2009.01) |
| H04W 76/02 | (2009.01) |
| H04M 1/725 | (2006.01) |
| H04W 4/04 | (2009.01) |
| H04W 8/00 | (2009.01) |
| H04L 29/08 | (2006.01) |
| G06K 9/00 | (2006.01) |

(52) U.S. Cl.
CPC .............. *H04W 76/023* (2013.01); *H04L 67/36* (2013.01); *H04M 1/7253* (2013.01); *H04M 1/72544* (2013.01); *H04W 4/043* (2013.01); *H04W 8/005* (2013.01); *G06K 9/00671* (2013.01); *H04M 2250/52* (2013.01)

(58) Field of Classification Search
CPC .................................................. G01S 5/0009
See application file for complete search history.

(56) References Cited

U.S. PATENT DOCUMENTS

| 2003/0013461 A1* | 1/2003 | Mizune ............. | H04M 1/72572 455/456.1 |
| 2005/0148320 A1* | 7/2005 | Tanabe .............. | H04M 1/72536 455/411 |
| 2005/0192808 A1* | 9/2005 | Sugiyama ......... | G06F 17/30265 704/270 |
| 2006/0074494 A1* | 4/2006 | McFarland ............. | G05B 15/02 700/1 |
| 2008/0071559 A1* | 3/2008 | Arrasvuori ............. | G06Q 30/06 705/26.1 |
| 2010/0178873 A1* | 7/2010 | Lee ..................... | H04M 1/7253 455/41.3 |

(Continued)

FOREIGN PATENT DOCUMENTS

EP    2 293 531 A1    9/2011

OTHER PUBLICATIONS

International Search report issued on Nov. 29, 2012 in corresponding PCT Application No. PCT/SE2012/050393.

*Primary Examiner* — Cindy Trandai
(74) *Attorney, Agent, or Firm* — Patent Portfolio Builders, PLLC

(57) ABSTRACT

A mobile terminal includes a camera for capturing a first image, a radio transceiver for discovering wireless devices and determining a position of the discovered wireless devices with respect to the mobile terminal, processing means for projecting the position of each discovered wireless device onto the first image and creating a second image by overlaying symbols at the projected positions, and a display for displaying the second image, the mobile terminal being arranged for pairing, in response to a request from a user of the mobile terminal selecting one of the overlaid symbols, the corresponding wireless device with the mobile terminal.

11 Claims, 4 Drawing Sheets

(56) References Cited

U.S. PATENT DOCUMENTS

| | | | | |
|---|---|---|---|---|
| 2011/0037712 A1* | 2/2011 | Kim | H04M 1/7253 | 345/173 |
| 2011/0053642 A1* | 3/2011 | Lee | H04M 1/72563 | 455/556.1 |
| 2012/0019674 A1* | 1/2012 | Ohnishi | G08C 17/00 | 348/207.1 |
| 2012/0087301 A1* | 4/2012 | Brandt | H04W 4/043 | 370/328 |
| 2012/0088526 A1* | 4/2012 | Lindner | H04M 1/72522 | 455/457 |
| 2012/0172060 A1* | 7/2012 | Qing | H04M 1/7253 | 455/456.6 |
| 2013/0029685 A1* | 1/2013 | Moshfeghi | G01S 19/48 | 455/456.1 |
| 2013/0219288 A1* | 8/2013 | Rosenberg | H04M 3/54 | 715/748 |
| 2014/0232903 A1* | 8/2014 | Oshima | H04N 5/3532 | 348/229.1 |

* cited by examiner

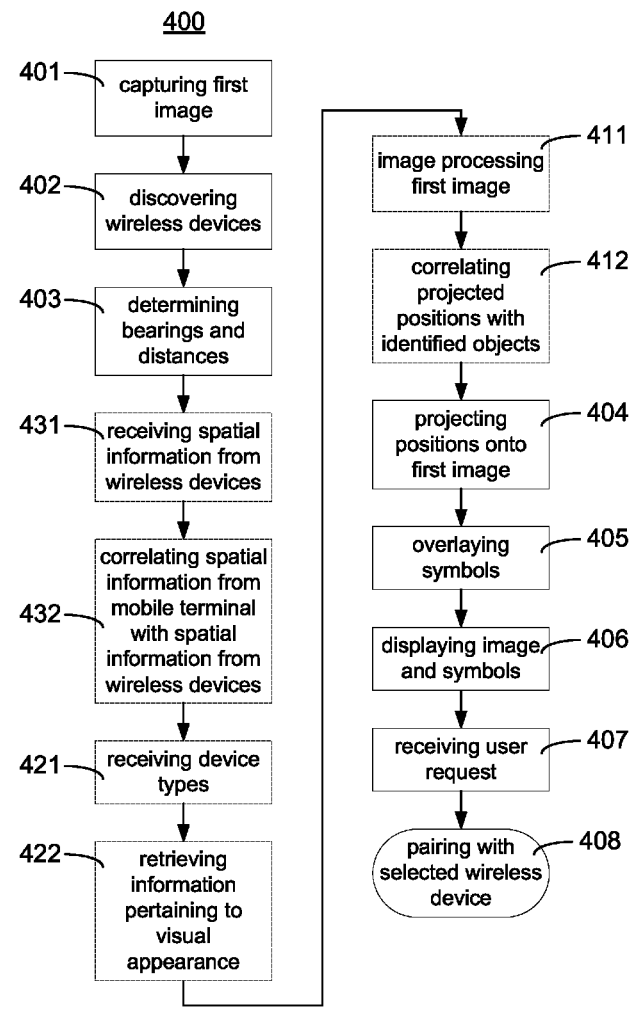

US 9,380,621 B2

PAIRING A MOBILE TERMINAL WITH A WIRELESS DEVICE

RELATED AND PRIORITY APPLICATIONS

This application is a national stage application of International Application No. PCT/SE2012/050393 filed on 12 Apr. 2012.

TECHNICAL FIELD

The invention relates to a mobile terminal and a method of pairing a mobile terminal with a wireless device. The invention relates also to a computer program and a computer program product.

BACKGROUND

The number of devices which are connectable to wireless communication networks continues to increase steadily. Apart from mobile phones, computers, tablet computers, and other electronic consumer gadgets, it is expected that all kinds of devices which may benefit from being connected to a communication network will be connected in the future. With this, the issue of connecting and controlling such devices becomes increasingly important.

For instance, a user may use his or her mobile phone to stream media to a loudspeaker or a television, to make voice calls using a headset, or to send documents to a printer. The communication between the mobile phone and the connected devices is typically effected through a wireless link, using Bluetooth, WiFi, ZigBee, a cellular radio technology, or any other wireless technology.

Before communication between the mobile phone and a connectable device may commence, a configuration of the devices taking part in the communication is usually required. To this end, a user may be required to indicate that a specific device may communicate with the user's mobile phone. This process is referred to as pairing. Typically, when a user wants to connect the mobile phone with another device, the mobile phone broadcasts a query for discovering wireless devices within range. Any device which is in discoverable mode will respond to the query. In the case of Bluetooth, e.g., a discoverable device will transmit its device name, device class, and a list of services supported by the device. The user of the mobile phone is then presented with a list of devices which responded to the query, allowing the user to select one or more devices for pairing. Subsequently, communication with the selected devices may commence. Under certain circumstances, pairing of a device with the mobile phone may require an additional authentication step, during which the user may be prompted to enter a code. The association between the mobile phone and a paired device is usually stored for future communication sessions Even though the list of discovered devices which is presented to the user may be filtered such that only a certain class of devices is presented, e.g., headsets, the list may still be rather extensive if many devices are within range. In particular, this may be the case if pairing is attempted in a crowded environment, such as a public place or a conference room. Moreover, the predominance of certain makes and models of consumer electronics makes the process of pairing even more difficult, as the user may be presented with a list of several similar devices. Since such devices frequently have their name set by the vendor, and devices of the same model are likely to have the same default device name, the user will be presented with a list of similar devices sharing the same name, which makes it difficult to identify and select the correct device.

SUMMARY

It is an object of the present invention to provide an improved alternative to the above techniques and prior art.

More specifically, it is an object of the present invention to provide an improved pairing of a mobile terminal with a wireless device.

These and other objects of the invention are achieved by means of different aspects of the invention, as defined by the independent claims. Embodiments of the invention are characterized by the dependent claims.

According to a first aspect of the invention, a mobile terminal is provided. The mobile terminal comprises a camera, a radio transceiver, processing means, and a display. The camera is arranged for capturing a first image. The radio transceiver is arranged for discovering at least one wireless device capable of effecting wireless communications with the mobile terminal, and determining a bearing and a distance from the mobile terminal to a position of each of the discovered wireless devices. The processing means is arranged for projecting the positions of the discovered wireless devices onto the first image. The processing means is further arranged for creating a second image by overlaying symbols onto the first image. The symbols are overlaid at the projected positions of the discovered wireless devices. The display is arranged for displaying the second image. The processing means is further arranged for pairing the selected discovered wireless device with the mobile terminal. The selected discovered wireless device is paired with the mobile terminal in response to a request from a user of the mobile terminal selecting one of the discovered wireless devices.

According to a second aspect of the invention, a method of pairing a mobile terminal with a wireless device is provided. The mobile terminal comprises a radio transceiver, a camera, and a display. The method comprises capturing a first image, discovering at least one wireless device capable of effecting wireless communications with the mobile terminal, determining a bearing and a distance from the mobile terminal to a position of each of the discovered wireless devices, projecting the positions of the discovered wireless devices onto the first image, creating a second image by overlaying symbols onto the first image, displaying the second image on the display, and pairing the selected discovered wireless device with the mobile terminal. The symbols are overlaid at the projected positions of the discovered wireless devices. The selected discovered wireless device is paired with the mobile terminal in response to a request from a user of the mobile terminal selecting one of the discovered wireless devices.

According to a third aspect of the invention, a computer program is provided. The computer program comprises computer program code. The computer program code is adapted, if executed on a processor, to implement an embodiment of the method according to the second aspect of the invention.

According to a fourth aspect of the invention, a computer program product is provided. The computer program product comprises a computer readable storage medium. The computer readable storage medium has the computer program according to the third aspect of the invention embodied therein.

The present invention is based on the idea that an improved pairing of a camera-equipped mobile terminal, such as a mobile phone, tablet computer, digital camera, or the like, with a wireless device may be achieved by augmenting an image taken with the camera of the mobile terminal with symbols indicating one or more discovered wireless devices which are available for pairing. In this respect, wireless devices are available for paring under the condition that they are within range of the radio technology by which the mobile terminal and the discovered wireless devices communicate, and that they are located within the subspace spanned by a viewing angle and a viewing direction of the camera, i.e., devices which may be captured by the camera. To this end, a user of a mobile terminal may pair the mobile terminal with a desired wireless device by taking a picture of a scene in which the desired wireless device is located, using the camera of the mobile terminal, and by selecting the desired device from the displayed image which is augmented by symbols indicating the discovered wireless devices, subsequent to which the pairing with the selected device is performed. The image may either be a still image which reflects the location of discovered wireless devices at the time the image was taken, or a video which shows the instantaneous location of such devices. In the latter case, a user of the mobile terminal may search for a desired wireless device by changing the orientation of the mobile terminal, and thereby the viewing direction of the built-in camera, until the desired device appears on the display, e.g., a screen, together with its overlaid symbol.

For the purpose of elucidating the invention, a wireless device may be any type of device capable of effecting wireless communications using a wireless communication technology such as Bluetooth, WiFi, ZigBee, near field communication (NFC), a cellular radio technology, or the like. A wireless device may, e.g., be a mobile phone, a computer, a digital camera, a mobile phone accessory such as a headset, a computer accessory such as a mouse, a printer, a loudspeaker, a speakerphone, a television, a projector, machine-to-machine (M2M) devices such as sensors and actuators, and so forth.

The bearing and the distance from the mobile terminal to a position of each of the discovered wireless devices may be determined by analyzing radio signals originating from the wireless devices and which are received at the mobile terminal, as is known in the art. This may, e.g., be accomplished using received signal strength measurements, possibly combined with information pertaining to the transmit power of the wireless devices, for determining the distance, and a directional antenna for determining the bearing. For each discovered wireless device, the position of the device is projected onto the first image based on the determined bearing and position. It will be appreciated by those skilled in the art that, in order to solve the straightforward task of projecting the positions of the discovered wireless devices onto the first image, the relative orientation of the bearings with respect to the viewing direction of the camera has to be known. In case of a mobile terminal having a built-in camera and a built-in directional antenna, each having a respective direction of reference, the direction of reference of the camera, i.e., the viewing direction, and the direction of reference of the directional antenna, relative to which the determined bearings are defined, have a known geometrical relationship.

It will also be appreciated that the request from a user of the mobile terminal, by which the user selects one of the discovered wireless devices for pairing, may be accomplished in different ways. For instance, the display of the mobile terminal may be a touch screen, allowing the user to select the desired wireless device by touching its associated overlaid symbol. Alternatively, instead of, or in addition to, the overlaid symbol, an identifier may be associated with each discovered wireless device and presented to the user, upon which the user may enter the identifier using a keypad or the like. The identifier may, e.g., be a number or a device name. Further, one may envisage embodiments of the invention utilizing cursor keys by which the user can select the desired wireless device. It will also be appreciated that an embodiment of the invention may be arranged for effecting pairing with a wireless device under the condition that its associated symbol is located within a marked region of the screen. For instance, a view finder may be displayed, and a user of the mobile terminal may effect pairing by pointing the camera such that the desired device, i.e., its associated symbol, is located within the view finder. In other words, the user may aim its mobile terminal, and with it the built-in camera, at the wireless device with which he or she wishes to pair its mobile terminal.

An embodiment of the invention is advantageous in that the process of pairing a camera-equipped mobile terminal with one or more wireless devices is simplified by utilizing an augmented-reality approach. To this end, a user of the mobile terminal may simply select a desired wireless device by selecting a symbol which is associated with the desired device and which is overlaid onto the image at the location of the device within the image. By combining visual information, i.e., the appearance of the desired device on the image, with spatial information, i.e., the position of the desired device projected onto the image, the problems inherent to pairing as known in the art are, at least in part, mitigated. In particular, the uncertainty associated with selecting the correct device from a list of discovered devices having the same or similar types and/or names is overcome. Further, if the image augmented by symbols indicating the locations of discovered wireless devices is a video which constantly reflects the instantaneous location of such devices on the screen, a user of the mobile terminal may search for a desired device by sweeping the camera over a scene, until the desired device emerges on the display.

According to an embodiment of the invention, the processing means is further arranged for identifying at least one object suitable for pairing, and correlating the projected position of each of the discovered wireless devices with the identified objects suitable for pairing. The at least one object suitable for pairing is identified by image processing the first image. To this end, image processing is used to identify objects contained in the first image which are suitable for pairing. For the purpose of elucidating the invention, an object is considered suitable for pairing if it is judged that the object appears, by its visual appearance, to be of a type which is likely to be provided with a radio transceiver, e.g., mobile phones, computers, headsets, and so forth. By correlating, i.e., combining, this additional visual information with the projected positions of discovered wireless devices, the reliability of the symbols which are associated with the discovered devices is improved, since the positions of the overlaid symbols can be determined more accurately. Thereby, the augmented reality presented to the user is enhanced.

According to another embodiment of the invention, the radio transceiver is further arranged for receiving information pertaining to a type of the discovered wireless device. The processing means is further arranged for retrieving information pertaining to a visual appearance of each type of discovered wireless device, and for identifying at least one object suitable for pairing based on the information pertaining to the visual appearance of each type of discovered wireless device. The information pertaining to a type of the discovered wireless device is received from at least some of the discovered wireless devices, and preferably from each of the discovered wireless devices. The information pertaining to a visual appearance of each type of discovered wireless device is retrieved from a database. To this end, a list of distinct device types, such as mobile phone, computer, tablet computer, loudspeaker, television, media player, headset, or the like, is compiled by querying the device type from the discovered wireless devices. The device type may also relate to a make, vendor, model, or the like. Subsequently, information pertaining to the visual appearance of the discovered device types is retrieved for a database, thereby reducing the effort required for image processing and increasing the reliability of its outcome. In particular, since it is beforehand known which types of devices are expected to be identified in the first image, the number of distinct device types being rather small, image processing may commence more efficiently. Information pertaining to the visual appearance of a device may, e.g., be images or silhouettes with different views, fiducial markers, characteristic logotypes, 3D models such as AutoCad drawings, and so forth. The database may be internal, i.e., provided with the mobile terminal, or external, e.g., provided on a server which is accessible by the mobile terminal. As a further alternative, a discovered wireless device may provide information pertaining to its visual appearance to the mobile terminal, either autonomously or on request. It will also be appreciated that information pertaining to visual appearance may pertain to a tag, such as a bar code, with which a wireless device is provided. In this case, an object suitable for pairing may be identified by detecting its tag, using image processing.

According to a further embodiment of the invention, the radio transceiver is further arranged for receiving information pertaining to respective distances from a discovered wireless device to other discovered wireless devices, and the processing means is further arranged for correlating the bearings and distances determined by the mobile terminal with the distances received from the discovered wireless devices. The information pertaining to respective distances from the discovered wireless device to other discovered wireless devices is received from at least one of the discovered wireless devices, and is preferably received from several or all discovered wireless devices. Optionally, information pertaining to respective bearings from the discovered wireless device to other discovered may be received from at least some of the discovered wireless devices, and preferably from all of them. This is advantageous in that the projected positions of the discovered wireless devices, at which projected positions the associated symbols are overlaid, may be determined more accurately. To this end, spatial information, i.e., bearings and distances to discovered wireless devices, determined at the mobile terminal are correlated, i.e., combined, with spatial information determined at one or more of the discovered wireless devices. By combining the spatial information received from different sources, a three-dimensional map of the mobile terminal and the discovered wireless devices may be derived.

Even though advantages of the present invention have in some cases been described with reference to embodiments of the mobile terminal according to the first aspect of the invention, corresponding reasoning applies to embodiments of the method according to the second aspect of the invention, embodiments of the computer program according to the third aspect of the invention, and embodiments of the computer program product according to the fourth aspect of the invention.

Further objectives of, features of, and advantages with, the present invention will become apparent when studying the following detailed disclosure, the drawings and the appended claims. Those skilled in the art realize that different features of the present invention can be combined to create embodiments other than those described in the following.

BRIEF DESCRIPTION OF THE DRAWINGS

The above, as well as additional objects, features and advantages of the present invention, will be better understood through the following illustrative and non-limiting detailed description of embodiments of the present invention, with reference to the appended drawings, in which:

FIG. 4 illustrates a method of pairing a mobile terminal with a wireless device, in accordance with an embodiment of the invention.

All the figures are schematic, not necessarily to scale, and generally only show parts which are necessary in order to elucidate the invention, wherein other parts may be omitted or merely suggested.

DETAILED DESCRIPTION

Figure 1:
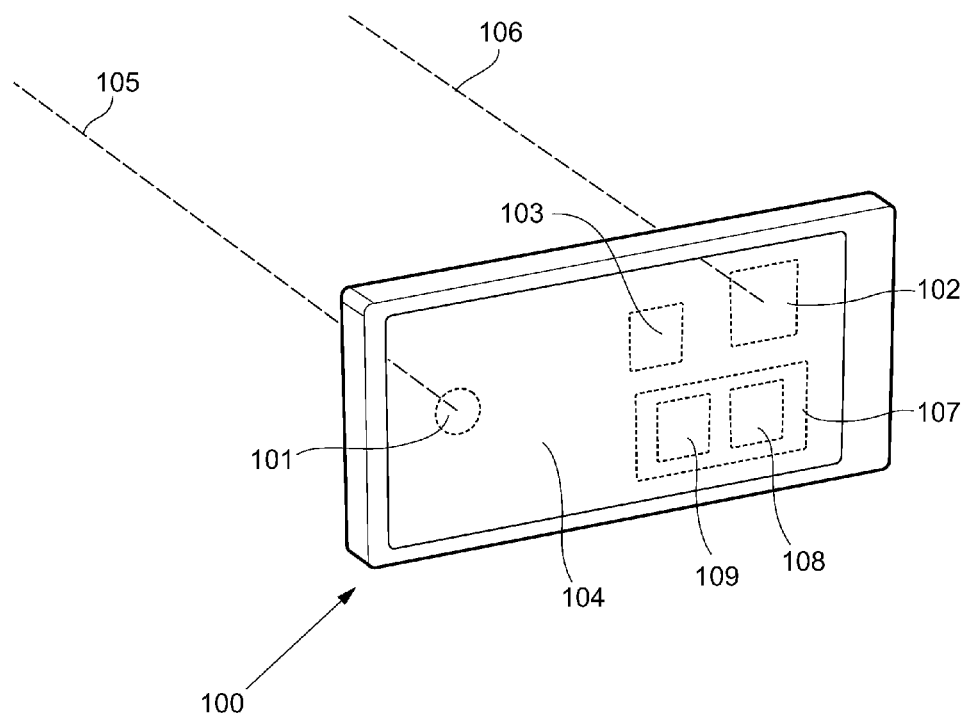
FIG. 1 shows a mobile terminal, in accordance with an embodiment of the invention.

In the following, a mobile terminal will be described with reference to FIG. 1, in accordance with embodiments of the invention. Note that even though a mobile phone 100 is illustrated in FIG. 1, the invention is not limited to this specific type of mobile terminal. Rather, a mobile terminal may be any type of device capable of wireless communications and being equipped with a camera and a display, e.g., an ordinary screen or a touch screen. For instance, a mobile terminal may be a mobile phone, a smart phone, a tablet computer, a laptop, a digital camera, a media player, or the like.

As an illustrative example, mobile phone 100 comprises a camera 101, means 102 for effecting wireless communications in accordance with a wireless technology such as Bluetooth, WiFi, ZigBee, NFC, or a cellular radio technology, i.e., a radio transceiver, processing means 103, and a touch screen 104 for displaying images or video and for receiving user input. Typically, a mobile terminal will comprise additional components. In particular, a mobile phone may comprise multiple radio transceivers being arranged for effecting wireless communications in accordance with different technologies. For instance, a mobile phone may comprise a first radio transceiver for a cellular radio technology like GSM, WCDMA, or LTE, a second radio transceiver for WiFi, and a third radio transceiver for Bluetooth.

Camera 101 is arranged for capturing a first image, under control of a user of mobile phone 100, who may point the camera into a desired direction. Typically, the first image, which may either be a still image or video, is displayed as a preview image on touch screen 104.

Radio transceiver 102 is arranged for discovering at least one wireless device capable of effecting wireless communications with mobile phone 100. This may, e.g., be achieved by transmitting a query to which wireless devices within the range of the wireless technology used for communicating respond by transmitting information pertaining to their respective identity. As an alternative, wireless devices may autonomously transmit such information. Identity information may, e.g., comprise an identifier of the wireless device, a network address of the wireless device, information pertaining to a type of the device, make and/or vendor information, or a list of services and/or functionality supported by the wireless device. For the purpose of describing the invention, all wireless devices responding to a query by mobile phone 100 are referred to as discovered wireless devices.

Further, radio transceiver 102 is arranged for determining a bearing and a distance from mobile phone 100 to a position of each of the discovered wireless devices. This may, e.g., be achieved by analyzing the received signal strength of radio signals received from a discovered wireless device, and by determining the direction from which such radio signals are received. The latter may be accomplished by using a directional antenna, which radio transceiver 102 is provided with, and which has a direction of reference 106 relative to which the bearings are defined.

Processing means 103 is arranged for projecting the position of each of the discovered wireless devices onto the first image. In this respect, it will be appreciated by those skilled in the art that a known, and preferably fixed, geometrical relationship between viewing direction 105 and an orientation of the directional antenna, i.e., its direction of reference 106, is required in order to correctly calculate the projected positions, which amounts to solving a simple geometrical problem.

Further, processing means 103 is arranged for creating a second image by overlaying a symbol at the projected position of each of the discovered wireless devices onto the first image. The second image is then displayed on touch screen 104. An embodiment of the invention may be arranged for combining the spatial information obtained from radio signals with the visual information, i.e., the first image, only for discovered wireless devices which are visible on touch screen 104, i.e., devices which are located within the subspace defined by a viewing direction 105 and a viewing angle of camera 101. In this respect, a wireless device may not appear on the first image, despite being located within the subspace covered by camera 101, because the device is obstructed and therefore not visible to camera 101.

Processing means 103 is further arranged for pairing a selected wireless device with mobile phone 100. The pairing is initiated in response to a user request, received via touch screen 104, the user selecting a wireless device for pairing by touching its associated symbol. Alternatively, radio transceiver 102 may be arranged for effecting the pairing.

Processing means 103 may comprise a single processor or multiple processors which may share the processing tasks. Further, camera 101, radio transceiver 102, and/or touch screen 104 may comprise processing capabilities which may be utilized in accordance with an embodiment of the invention.

To this end, for each discovered wireless device, mobile phone 100 determines the position of the wireless device, which position is defined by the distance and the bearing from mobile phone 100 to the wireless device, projects the position onto the first image, and overlays a symbol at the projected position onto the preview image displayed on touch screen 104. Thus, each of the overlaid symbols represents a discovered wireless device. A user may select a wireless device for pairing by selecting its associated symbol, in response to which pairing is initiated.

Note that, even though mobile phone 100 has been illustrated as comprising a touch screen 104, one may envisage embodiments of the invention comprising a screen and a user interface which is separate from the screen. For instance, an embodiment of the invention may comprise a key pad, cursor buttons, or may support voice control. Depending on which type of user interface is provided, a user may select a wireless device for pairing by entering an identifier displayed together with each symbol, by traversing the displayed symbols using cursor keys and confirming that pairing is to be performed when the desired symbol is selected, or using his or her voice to initiate pairing. As a further alternative, a view finder may be displayed on touch screen 104, i.e., a target region such as a circle, and mobile phone 100 may be arranged for initiating pairing with a wireless device under the condition that its associated symbol is located within the target region for a certain period of time.

Further with reference to FIG. 1, mobile phone 100 may further be arranged for identifying suitable wireless devices for pairing by image processing the first image, and by correlating the information obtained from image processing with the spatial information derived from radio signals received by mobile phone 100, i.e., the distances and bearings from mobile phone 100 to discovered wireless devices. The image processing may be performed by processing means 103, or using processing capabilities which, e.g., camera 101 or touch screen 104 are provided with. For instance, an embodiment of the invention may comprise a camera 101 having a dedicated image processor, or a touch screen 104 having a dedicated graphics processor.

To this end, wireless devices suitable for pairing are identified by detecting objects in the first image which, by their visual appearance, appear to be of a type which is likely to be equipped with a radio transceiver. For instance, an embodiment of the invention may be arranged for detecting computers, mobile phones, speakerphones, headsets, computer accessories, or the like. The task of correlating the projected position of each of the discovered wireless devices with the identified objects suitable for pairing amounts to combining the available information in such a way that an improved accuracy for determining the position of discovered wireless devices contained in the first image is achieved. For instance, an embodiment of the invention may be arranged for matching objects suitable for pairing, obtained from image processing, with projected positions obtained from analyzing received radio signals, under the condition that the detected object and the projected position are, with respect to their respective location on the first image, close to each other.

In order to further improve the accuracy of the overlaid symbols, mobile phone 100 may further be arranged for receiving information pertaining to a type of the discovered wireless device. Such information is preferably received from each of the discovered wireless devices. Information pertaining to a type of the discovered wireless device may relate to a generic device type, e.g., mobile phone, computer, tablet computer, loudspeaker, television, headset, and so forth, but may also relate to make, vendor, model, or the like. Mobile phone 100 is further arranged for retrieving information pertaining to a visual appearance of each type of discovered wireless device from a database, and for identifying at least one object suitable for pairing based on the information pertaining to the visual appearance of each type of discovered wireless device.

To this end, mobile phone 100 compiles a list of device types by receiving the device type from the discovered wireless devices, and uses this information to identify objects suitable for pairing by image processing. For this purpose, information pertaining to a visual appearance of each detected device type is retrieved from a database. The database may either be an internal database 108, which may, e.g., be stored in a storage device of mobile phone 100, such as memory 107, or an external database to which mobile phone 100 has access. Such an external database may, e.g., be provided by an operator of a mobile network to which a user of mobile phone 100 is subscribed to, or be provided by a third party.

Information pertaining to the visual appearance of a device may, e.g., be images of a device having the detected type, which images may represent different views. Alternatively, such information may pertain to silhouettes or fiducial markers. It will also be appreciated that, instead of retrieving the information from a database, mobile phone 100 may receive information pertaining to the visual appearance of a discovered wireless device directly from the device. To this end, wireless devices may be arranged for providing such information to mobile phone 100 by responding to the query transmitted by mobile phone 100 for the purpose of discovering wireless devices. Alternatively, wireless devices may be arranged for transmitting such information in response to a separate query for that purpose, or autonomously.

Mobile phone 100 may further be arranged for receiving spatial information from each of the discovered wireless devices. In this respect, spatial information comprises respective distances and/or respective bearings from the discovered wireless device to other discovered wireless devices. Such information is correlated with the bearings and distances determined by the mobile terminal, thereby improving the accuracy of the projected positions and, accordingly, the coincidence of the overlaid symbols with the location of their associated devices on the screen. To this end, a three-dimensional map of all wireless devices within range of the radio technology used by mobile phone 100 may be build based on spatial information obtained by analyzing radio signals received either by mobile phone 100 or any of the discovered wireless devices.

Figure 2:
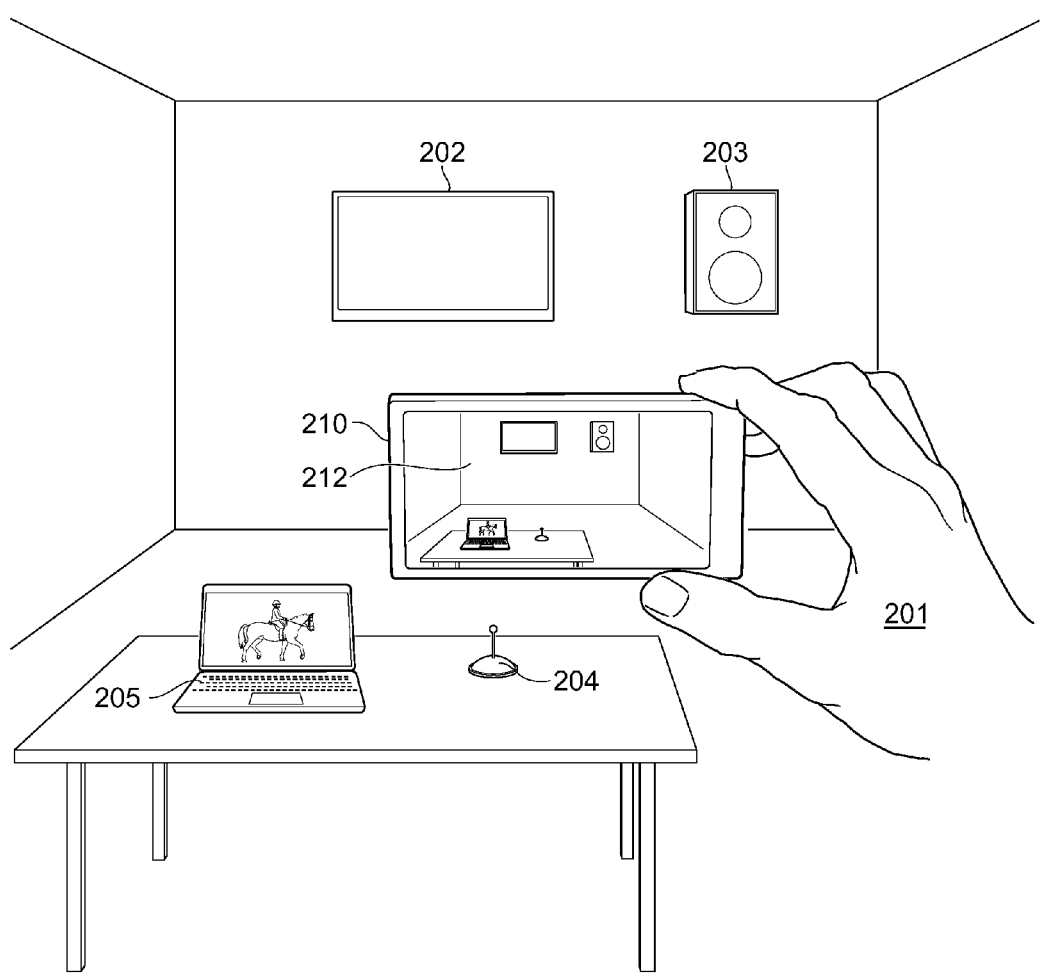
FIG. 2 illustrates pairing of a mobile terminal with a wireless device, in accordance with an embodiment of the invention.

In the following, the process of pairing a mobile terminal, with a wireless device is illustrated in FIG. 2, in accordance with embodiments of the invention.

In FIG. 2, mobile terminal 210 is illustrated as a mobile phone, such as mobile phone 100 described with reference to FIG. 1, or any other mobile terminal in accordance with an embodiment of the invention. A wireless device may, e.g., be a television 202, a loudspeaker 203, a speakerphone 204, or a computer 205. For the purpose of elucidating the invention, a wireless device is to be understood as a device capable of wireless communications. For this purpose, each of the wireless devices 202-205 is provided with a radio transceiver for effecting wireless communications in accordance with a wireless technology such as Bluetooth, WiFi, ZigBee, NFC, or a cellular radio technology.

In order to pair his or her mobile phone 210 with one of the wireless devices 202-205, user 201 points a camera 211, which mobile phone 210 is equipped with, such that wireless devices 202-205, or at least the wireless device which the user wants to pair mobile phone 210 with, are captured by camera 211. The scene captured by camera 211 is determined by a viewing direction and a viewing angle of camera 211. A preview image may be displayed on a screen 212 of mobile phone 210, providing user 201 with a snapshot or an instantaneous view of the current viewing direction and viewing angle, depending on whether a still image or a video is captured, respectively.

In addition to displaying a preview image from camera 211 on screen 212, mobile phone 210 is arranged for discovering wireless devices suitable for pairing and overlaying an associated symbol with each discovered wireless device, subsequent to which user 201 may select a wireless device for pairing. For this purpose, mobile phone 210 attempts to discover all wireless devices 202-205 within the range of the utilized wireless communication technology, which typically is a few meters or a few tens of meters, depending on the type of radio technology and transmission power used. Discovering wireless devices suitable for pairing amounts to transmitting, from mobile phone 210, a query to which wireless devices 202-205 respond by transmitting information pertaining to their identity. In response to receiving responses from wireless devices 202-205, mobile phone 210 determines the position of each discovered wireless device 202-205 relative to mobile phone 210. This is achieved by determining the distance and the bearing from mobile phone 210 to each of the discovered wireless devices 202-205, as was described with reference to FIG. 1. The position of each discovered wireless device 202-205 is then projected onto the first image, and a symbol is overlaid at the respective position of each wireless device 202-205, resulting in a second image. Consequently, each symbol is associated with a corresponding wireless device.

Figure 3:
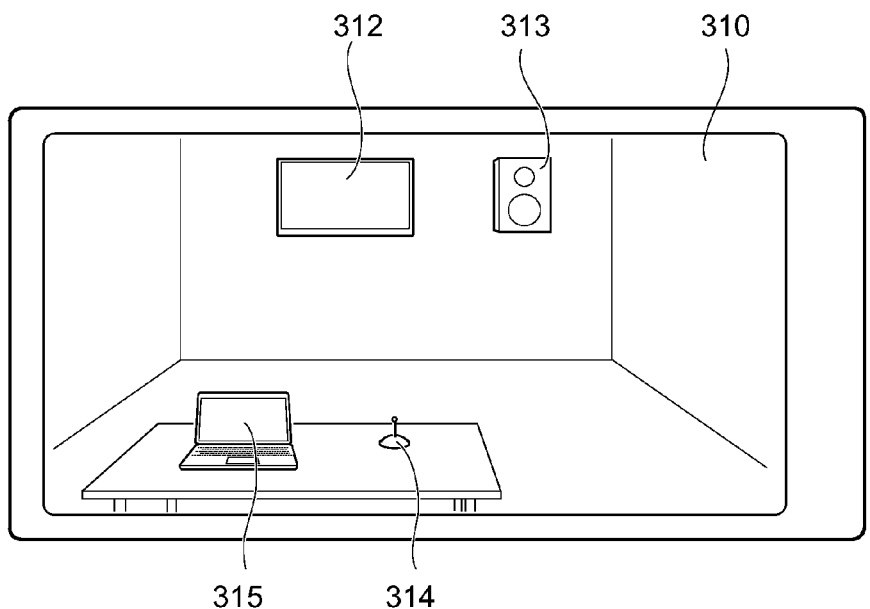
FIG. 3 shows a preview image and an augmented image, in accordance with an embodiment of the invention.
Figure 3:
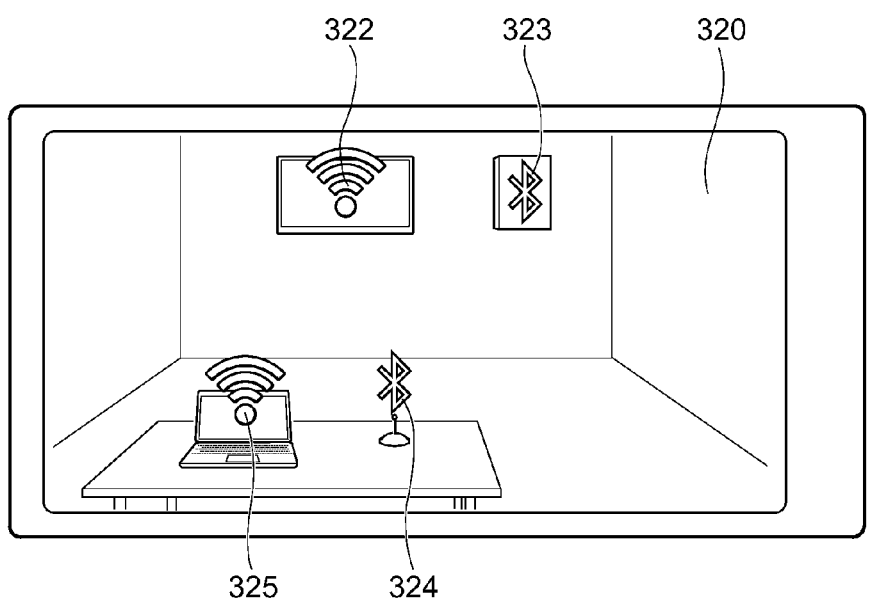
Figure 3:
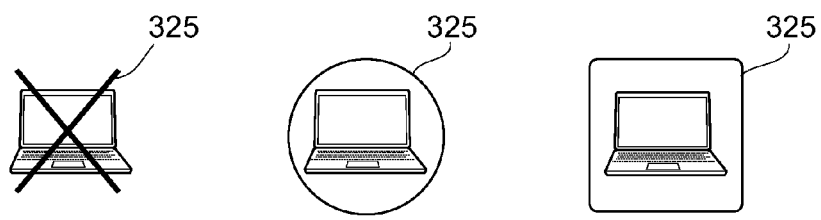

The augmented image is illustrated in FIG. 3, which shows a preview image 310 from camera 211, i.e., the first image. Further, a second image 320 is shown which includes the associated symbols 322-325 overlaid at the projected positions of the discovered wireless devices 202-205. If image processing is performed on first image 310, in accordance with an embodiment of the invention, objects 312-315 suitable for pairing are identified in first image 310, and their respective positions within first image 310 are correlated with the projected positions of the discovered wireless devices 202-205. The purpose of symbols 322-325 is to indicate the discovered wireless device, thereby allowing the user to select one of the discovered wireless devices 202-205 for pairing. It will be appreciated that different kinds of symbols may be used, e.g., crosses 306, circles 307, squares 308, or the like. Further, an embodiment of the invention may use symbols which are indicative of the type of wireless radio technology used between mobile phone 210 and each of the wireless devices 202-205, as is exemplified in FIG. 3. In this case, television 202 and computer 205 are using WiFi, as is indicated by symbols 322 and 325, whereas loudspeaker 203 and speakerphone 204 use Bluetooth, as is indicated by symbols 323 and 324.

Further with reference to FIGS. 2 and 3, user 201 may initiate pairing of one of the discovered wireless devices 202-205 with mobile phone 210 by selecting, on touch screen 212, the symbol which is associated with the desired wireless device. For instance, in order to pair mobile phone 210 with speakerphone 204, user 201 selects symbol 324, in response to which mobile phone 210 performs the pairing, as is known in the art. After pairing, a voice call may be performed using speakerphone 204. Correspondingly, if pairing is performed with the other wireless devices 203-205, video content may be streamed from mobile phone 210 to television 202, audio content may be streamed from mobile phone 210 to loudspeaker 203, or files may be transferred between mobile phone 210 and computer 205.

In the following, and with reference to FIG. 4, a method 400 of pairing a mobile terminal with a wireless device is described, in accordance with embodiments of the invention. The mobile terminal may, e.g., be mobile phone 100, described with reference to FIG. 1, or mobile phone 210, described with reference to FIG. 2.

Method 400 starts with capturing 401 a first image, using a camera which the mobile terminal is provided with. In the next step 402, one or more wireless devices capable of effecting wireless communications with the mobile terminal are discovered. This may, e.g., be achieved by transmitting a query from the mobile terminal, to which query the wireless devices which are within range may respond, as was described hereinbefore. Then, a bearing and a distance from the mobile terminal to a position of each of the discovered devices are determined 403, and the positions are projected 404 onto the first image. In the next step 405, a second image is created by overlaying a symbol at the projected position of each of the discovered wireless devices onto the first image. Subsequently, the second image is displayed 406, thereby presenting the presence of one or more discovered wireless devices to a user of the mobile terminal. The user may select one of the displayed symbols, thereby requesting pairing of the mobile terminal with the wireless device which is associated with the selected symbol. Upon receiving 407 the user request, pairing 408 with the selected wireless device is performed.

Optionally, method 400 may further comprise the steps of image processing 411 the first image so as to identify one or more objects suitable for pairing, and correlating 412 the projected positions of the discovered wireless devices with the identified objects suitable for pairing, as was described hereinbefore.

As a further option, method 400 may further comprise receiving 421 information pertaining to a respective type of the discovered wireless devices, and retrieving 422 information pertaining to a visual appearance of each type of discovered wireless device from a database. The retrieved information pertaining to the visual appearance of each type of discovered wireless device is used as an input for the step of image processing 411 the first image.

As yet a further option, method 400 may further comprise receiving 431, from one of the discovered wireless devices, information pertaining to respective distances from the discovered wireless device to other discovered wireless devices, and correlating 432 the bearings and distances determined by the mobile terminal with the distances received from the discovered wireless devices. For instance, with reference to FIG. 2, television 202 may be arranged for determining respective distances between television 202 and each of the other wireless devices 203-205, and transmitting the distances to mobile terminal 210. The other wireless devices may be arranged correspondingly. In addition to distances from the discovered wireless device to other discovered wireless devices, respective bearings from the discovered wireless device to other discovered wireless devices may be received 431 from the discovered wireless devices and used in correlating 432 spatial information determined at the mobile terminal with spatial information determined at he discovered wireless devices.

An embodiment of the method according to the second aspect of the invention may be implemented as a computer program comprising computer program code, e.g., an app. In this way, an existing mobile terminal, e.g., a mobile phone, may be adapted to perform in accordance with an embodiment of the invention by providing the mobile phone with an embodiment of the computer program. For instance, with reference to FIG. 1, a computer program 109 may be loaded into memory 107 of mobile phone 100. Computer program 109 comprises computer program code which, when executed by processor 103, is adapted to implement at least parts of the method according to the second aspect of the invention, thereby turning an existing mobile phone into a mobile phone in accordance with an embodiment of the invention.

An existing mobile terminal, such as mobile phone 100 described with reference to FIG. 1, may be provided with an embodiment of computer program 109 by means of a computer program product, such as memory 107, or a memory stick which may be connected to a mobile terminal. Alternatively, an embodiment of computer program 109 may be downloaded to a mobile terminal, e.g., to memory 107 of mobile phone 100. This may, e.g., be accomplished over a mobile network to which a user of the mobile terminal is subscribed to, or by downloading an app from the internet.

The person skilled in the art realizes that the present invention by no means is limited to the embodiments described above. On the contrary, many modifications and variations are possible within the scope of the appended claims. For example, in accordance with an embodiment of the invention, it suffices if the wireless devices are equipped with a radio transmitter only, instead of a radio transceiver. It will be appreciated that, in this case, the wireless devices do not respond to queries by the mobile terminal but transmit their identity, and other information, autonomously. Further, at least part of the processing may be performed externally to the mobile terminal. For instance, instead of image processing the first image at the mobile terminal, one may envisage embodiments of the invention being arranged for transmitting the first image to an external entity, such as a server, where the image processing and identifying objects suitable for pairing are performed, and subsequently receiving information pertaining to the outcome of the image processing for further use. Such an external entity, or server, may be combined with a database from which information pertaining to a visual appearance of a device is retrieved.

The invention claimed is:

1. A mobile terminal comprising:
   a camera that captures a first image,
   a radio transceiver that:
   discovers one or more wireless devices capable of effecting wireless communications with the mobile terminal,
   determines a bearing and a distance from the mobile terminal to a position of each of the discovered wireless devices, and
   receives, from at least one of the discovered wireless devices, information pertaining to respective distances from the at least one discovered wireless device to other discovered wireless devices,
   a processor that:
   correlates the bearing and distance from the mobile terminal to the position of the at least one discovered wireless device determined by the mobile terminal with the distances from the at least one discovered wireless device to other discovered wireless devices received from the discovered wireless devices to generate a three-dimensional map including the position of each of the discovered wireless devices,
   projects the position of each of the discovered wireless devices onto the first image, and
   creates a second image by overlaying symbols, onto the first image, at the projected positions of each of the discovered wireless devices, and
   a display that displays the second image, wherein the processor further pairs, in response to a request from a user of the mobile terminal selecting one of the discovered wireless devices, the selected discovered wireless device with the mobile terminal.

2. The mobile terminal according to claim 1, wherein the processor further:
   identifies, by image processing the first image, at least one object suitable for pairing, and
   correlates the projected position of each of the discovered wireless devices with the identified objects suitable for pairing.

3. The mobile terminal according to claim 2, wherein the radio transceiver further:

receives, from each of the discovered wireless devices, information pertaining to a type of the discovered wireless device, and the processor further:

retrieves, from a database, information pertaining to a visual appearance of each type of discovered wireless device, and identifies at least one object suitable for pairing based on the information pertaining to the visual appearance of each type of discovered wireless device.

4. The mobile terminal according to claim 1, wherein the display is a touch screen.

5. The mobile terminal according to claim 1, wherein the radio transceiver is a Bluetooth radio transceiver.

6. The mobile terminal according to claim 1, wherein the radio transceiver is a WiFi radio transceiver.

7. A method of pairing a mobile terminal comprising a radio transceiver, a camera, and a display, with a wireless device, the method comprising:

capturing a first image, discovering at least one wireless device capable of effecting wireless communications with the mobile terminal, determining a bearing and a distance from the mobile terminal to a position of each of the discovered wireless devices, receiving, from each of the discovered wireless devices, information pertaining to respective distances from the discovered wireless device to other discovered wireless devices, correlating the bearing and distance from the mobile terminal to the position of the at least one discovered wireless device determined by the mobile terminal with the distances from the at least one discovered wireless device to other discovered wireless devices received from the discovered wireless devices to generate a three-dimensional map including the position of each of the discovered wireless devices, projecting the position of each of the discovered wireless devices onto the first image, creating a second image by overlaying symbols, onto the first image, at the projected positions of the discovered wireless devices, displaying the second image on the display, and pairing, in response to a request from a user of the mobile terminal selecting one of the discovered wireless devices, the selected discovered wireless device with the mobile terminal.

8. The method according to claim 7, further comprising:

identifying, by image processing the first image, at least one object suitable for pairing, and correlating the projected position of each of the discovered wireless devices with the identified objects suitable for pairing.

9. The method according to claim 8, further comprising:

receiving, from each of the discovered wireless devices, information pertaining to a type of the discovered wireless device, and retrieving, from a database, information pertaining to a visual appearance of each type of discovered wireless device, wherein the identifying at least one object suitable for pairing is based on the information pertaining to the visual appearance of each type of discovered wireless device.

10. A non-transitory computer program product embodied with a computer-executable computer program comprising computer program code, the computer program code being adapted, if executed on a processor, to implement the method according to claim 7.

11. A non-transitory computer program product comprising a computer readable storage medium, the computer readable storage medium having the computer program according to claim 10 embodied therein.

* * * * *